Jan. 29, 1952     G. E. UNDY     2,583,755
ELECTRICAL CONTROL SYSTEM
Filed June 2, 1945     2 SHEETS—SHEET 1
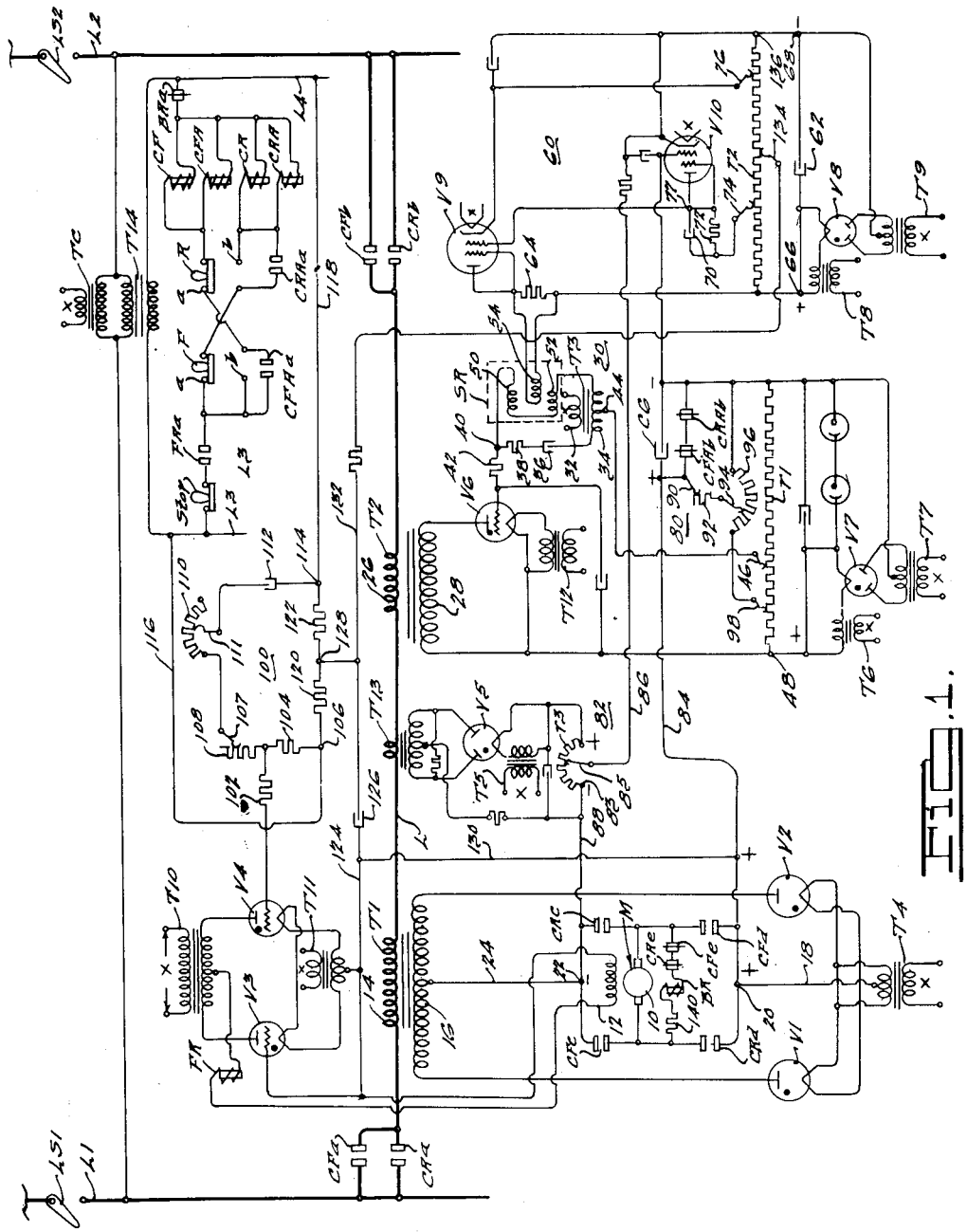
INVENTOR.
*Gustav E. Undy.*
BY
*Harness, Dickey & Pierce.*
ATTORNEYS.

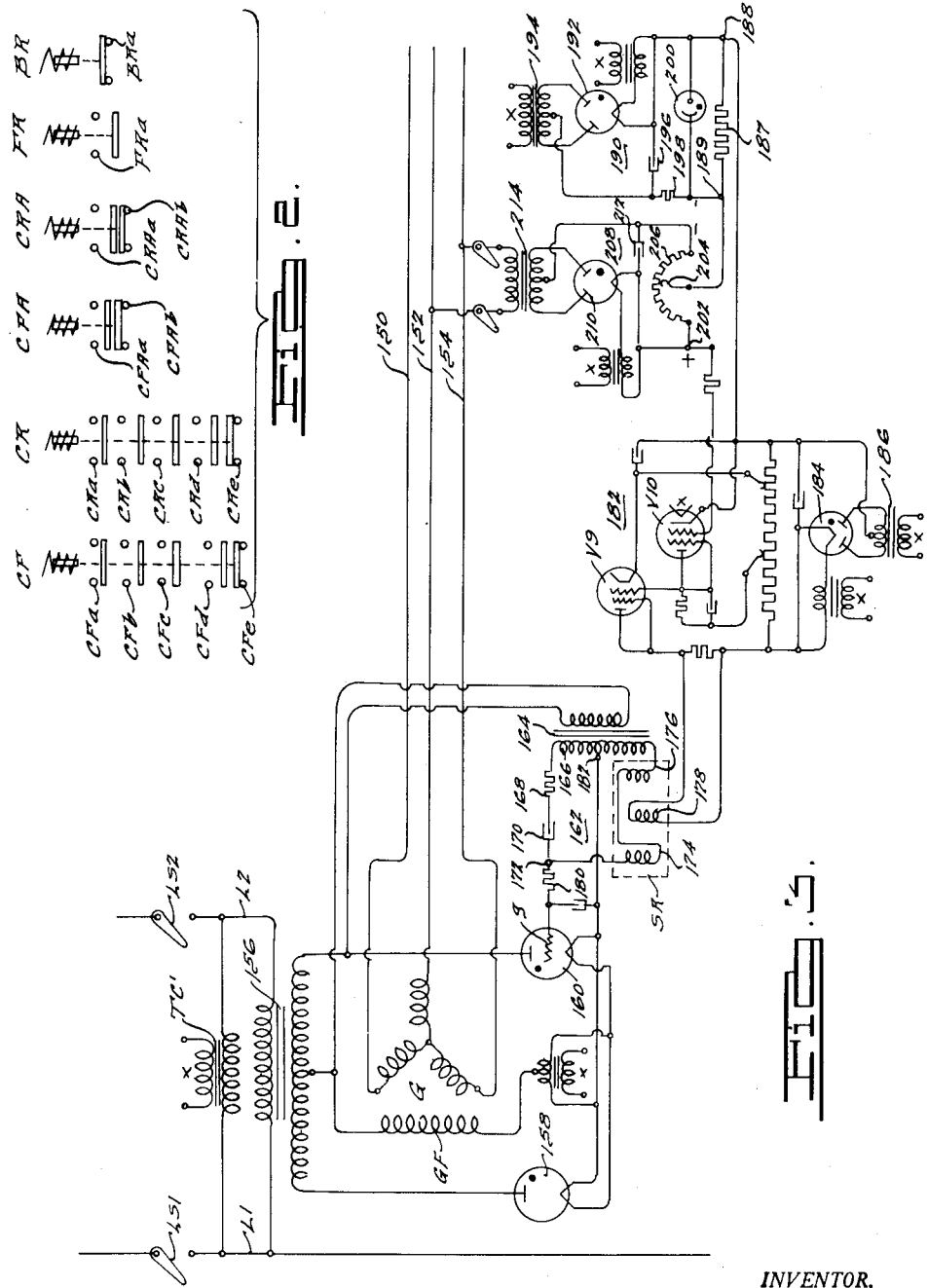

Patented Jan. 29, 1952

2,583,755

UNITED STATES PATENT OFFICE 2,583,755

ELECTRICAL CONTROL SYSTEM

Gustav E. Undy, Detroit, Mich., assignor, by mesne assignments, to Weltronic Company, a corporation of Michigan Application June 2, 1945, Serial No. 597,275

25 Claims. (Cl. 322—73)

1

The present invention relates to electrical control apparatus of the electronic type, and is particularly directed to the provision of improved electronic voltage regulating and controlling apparatus. In one of its illustrated embodiments, the invention provides an improved motor controlling and regulating system; and in another illustrated embodiment, the invention provides an improved system for regulating the output of a generating system.

Principal objects of the invention are to provide apparatus of the above indicated character, which is simple in arrangement, economical of manufacture and assembly, and which is reliable and efficient in operation; to provide such apparatus which is very rapid in response, and which consequently avoids hunting effects; to provide such apparatus utilizing one or more saturable reactors, each having alternating and direct current windings, and wherein the direct current excitation is controlled in accordance with the condition to be regulated; to provide such systems utilizing an alternating current load circuit, which includes a series reactor, and further including improved means for controlling the impedance of the reactor, whereby to correspondingly control the voltage applied to the load; and to generally improve and simplify the construction, arrangement, and operation of electronic voltage regulating and controlling systems.

With the above as well as other and, in certain cases, more detailed, objects in view, preferred but illustrative embodiments of the invention are shown in the accompanying drawings, throughout the several views of which corresponding reference characters are used to designate corresponding parts and in which;

Figure 1 is a diagrammatic view of an electronic motor control system embodying the invention;

Figure 2 is a diagrammatic view illustrating the mechanical relation between certain coils and contacts which, though correspondingly designated, are shown separately from each other in Figure 1, and;

Figure 3 is a diagrammatic view of a voltage regulating system embodying the invention.

It will be appreciated from a complete understanding of the present invention, that, in a generic sense, the improvements thereof may be embodied in widely differing systems, designed for widely differing applications. Preferred but illustrative applications of the invention are in connection with electronically controlled motor control systems, and in connection with electronically controlled voltage regulating systems,

2 for regulating, for example, the voltage of alternating current generating systems. Accordingly, in an illustrative but not in a limiting sense, the invention is so disclosed herein.

The system of Figure 1 is arranged to control the starting, accelerating, and operation, under varying load conditions, of a usual direct current motor M, having an armature 10, and a usual separately excited field winding 12. Excitation for both the armature and field windings of motor M is derived from a usual alternating current source, indicated as being a single phase source, having conductors L1 and L2, and which are provided with usual disconnect switches LS1 and LS2. More particularly, the armature of motor M is disposed to be reversibly connected, through the indicated contacts of the "forward" contactor CF and the "reverse" contactor CR, to receive power from a rectifier which comprises valves V1 and V2 and a transformer T1. The primary winding 14 of transformer T1 is connected in the load circuit L, in series with normally opened contacts of the previously mentioned contactors CF and CR. The terminals of the secondary winding 16, of transformer T1, are connected to the anodes of valves V1 and V2, the cathodes whereof are connected, through conductor 18, to the positive terminal 20 of the motor armature circuit. The negative terminal 22 of the motor armature circuit, in turn, is connected, by conductor 24, to a center tap on secondary winding 16.

In accordance with the present invention, the motor speed regulation, (to compensate for variations in line voltage as well as to compensate for changes in motor load), and the determination of the motor operating speed, (for speeds up to base speed), is effected by adjusting the proportion of the line voltage, of conductors L1—L2, which is applied to the main transformer T1. More particularly, this is accomplished by interposing in the load circuit L, in series with the main transformer T1, a variable reactance device which takes the form of a transformer having a primary winding 26 and a secondary winding 28. The secondary winding 28 is connected in a local circuit with a gas filled discontinuous control type valve V6, and the aforementioned control is effected by variably determining the firing point of valve V6 in each successive half cycle of like polarity.

Various circumstances, of course, may variably determine the relative impedances of the main transformer T1 and its associated motor armature circuits and transformer T2. In a typical case, and with the motor operating at or above its rated base speed, and at normal rated load, valve V6 is so controlled that the impedance of transformer T2 may be only approximately 10% of the impedance of transformer T1. Under the same speed conditions, but at no load, valve V6 is so controlled that the impedance of transformer T2 may be 150% to 200% of the impedance of transformer T1, in which event, of course, only between one-third and two-fifths of the line voltage is absorbed by transformer T1. Under the maximum load conditions, it is preferred to so control valve V6 that it is conductive throughout all or substantially all of each successive half cycle of like polarity whereas, under the above-mentioned no load conditions, valve V6 may be conductive throughout only 15 to 20% of each successive half cycle of like polarity. At rated load, valve V6 may be conductive during approximately 75% to 80% of each such half cycle. As is described below, the variable firing of valve V6 is controlled by automatically phase shifting the potential of its grid with respect to its cathode, and this phase shifting is effected fundamentally by apparatus which responds to the difference between a pair of opposed voltages.

One of such voltages, which serves as a reference voltage, is derived from a regulating circuit 80, which also serves, as described below, to control the acceleration of the motor. The second mentioned voltage is continuously equal to the difference between the voltage between the motor terminals 20—22 and the voltage between compensating terminals 83 and 85 of a compensating circuit 82, which responds to the current in the load circuit L. The last-mentioned component is variable so that either partial, full, or overcompensation for motor loads can be obtained.

Reverting now to transformer T2, an illustrative, but not limiting, explanation of its action, in response to the aforementioned variable control of valve V6 is as follows. It will be recognized that if the circuit of the secondary winding 28 is interrupted, transformer T2 represents a very high impedance. On the other hand, if such secondary circuit is short-circuited, the impedance of transformer T2 falls to a very low value. It is preferred to introduce sufficient iron into transformer T2 so that under open circuited secondary conditions, the applied line voltage causes the flow of insufficient magnetizing current, in successive half cycles, to saturate such iron. If now, the secondary winding 28 is virtually short-circuited (by the firing of valve V6) in any half cycle, a considerably increased magnetizing current is enabled to flow during the short-circuited part of such half cycle which, for descriptive purposes, can be considered as a positive half cycle. During the next succeeding negative half cycle, an opposite magnetomotive force is applied to the iron of transformer T2 which tends to bring to zero, and reverse, the magnetization of the iron. Being smaller in magnitude, such reversed magnetomotive force, though possibly able to reverse the magnetization of the iron, is not able to reversely magnetize it to a value corresponding to open circuited secondary conditions. During the next succeeding positive half cycle, in which valve V6 is again fired, the iron is consequently more strongly magnetized in a positive direction than would be the case under open circuited conditions. Similarly, during the next succeeding negative half cycle, the iron attains a smaller negative magnetization. During the course, accordingly, of a succession of half cycles, in alternate ones of which valve V6 is fired, the magnetization of the iron of transformer T2 builds up unidirectionally, and ultimately attains a condition in which, during successive positive and negative half cycles of the primary voltage, the entire magnetization loop lies above the $x$ axis. The unidirectional magnetization ultimately reaches the knee of the magnetization curve and thereafter progressively reduces the net change in flux in the iron of transformer T2 which is produced by the applied alternating magnetomotive force.

Moreover, transformer T2 ultimately obtains, for any given firing point of valve V6, a stable position for the magnetization loop, which lies, to varying degrees, past the knee of the magnetization curve.

At full load, under which conditions valve V6 is conductive throughout at least the major portion of each positive half cycle, the magnetization loop is driven well over the knee of the magnetization curve. At no load, on the other hand, the high magnetizing current flows only during a small portion of each half cycle. During the remainder of such half cycle, only the lower magnetizing current is enabled to flow. Thus, the magnetizing loop attains a stable position, in which less of the loop is past the knee, and at which the net change in flux in transformer T2 is considerably larger in value than is the case under full load conditions.

The current wave form in the secondary circuit of transformer T2 thus appears to be a succession of unidirectional pulses, each pulse representing a controlled fraction of a positive half cycle. Current and voltage wave forms in the load circuit L, on the other hand, remain approximately sinusoidal, the amplitude of the voltage wave available to transformer T1 being directly determined, of course, by the relative impedances of transformers T1 and T2, as determined by the variably controlled impedance of transformer T2.

The apparatus for controlling the firing of valve V6 includes alternating current network 30, which is supplied with alternating current from a transformer T3. The primary winding 32 of transformer T3 is continuously excited by a control transformer TC, as is indicated by the reference character $x$ which is applied to the terminals of transformers T3 and TC. It is here noted that control transformer TC also continuously supplies energy to all of the other indicated control transformers which have the reference character $x$ applied between the primary terminals thereof. These transformers are designated T4 through T12. Transformer TC also directly supplies filament current for the hereinafter described valves V9 and V10.

The terminals of the secondary winding 34 of transformer T3 are connected, through a condenser 36 and a resistor 38, on the one hand, and a saturable reactor SR on the other hand, to a terminal 40 which, in turn, is connected, through a control resistor 42, to the grid of valve V6. Winding 34 is provided with a center tap 44, which is connected, through an adjustable tap 46, to a potentiometer resistor $r1$. Resistor $r1$ has a constant D. C. voltage impressed across its terminals, from a source comprising valve V7 and transformer T7, and its positive terminal 48 is continuously connected to the cathode of valve V6. It will be recognized that the voltage between terminals 46 and 48 serves as a bias voltage, which acts in opposition to the phase shift voltage applied between the grid and cathode of valve V6, from the network 30.

It will further be appreciated that the phase relation between the anode and grid voltages of valve V6, depends upon the relative impedances of the impedance elements 36—38 on the one hand and the saturable reactor SR on the other hand. Further, so long as these voltages are in phase, valve V6 is conductive throughout all each successive half cycle of like polarity. To the extent that the grid voltage lags the anode voltage, valve V6 conducts during correspondingly smaller fractions of such successive half cycles. Also, the anode and grid voltages of valve V6 are in phase when the impedance of the saturable reactor SR is at a minimum. Increases in the impedance of reactor SR correspondingly increase the phase angle between the anode and grid voltages of valve V6.

Saturable reactor SR may be and preferably is of a usual three-legged type, the outer two legs whereof are provided with alternating current windings 50 and 52, and the central leg whereof carries a direct current winding 54. Windings 50 and 52 are so placed upon the outer legs that their fluxes cancel each other in the central leg. Except as modified by the effect of the D. C. winding 54, the excitation of windings 50 and 52 is insufficient to saturate the iron. It will be appreciated that as the excitation of winding 54 is increased, the net change in flux in reactor SR is progressively decreased and that in consequence, its impedance is correspondingly decreased. Preferably but not necessarily, the excitation of winding 54, at the rated load of motor M, is such as to maintain a direct current flux in reactor SR of a magnitude approximately equal to 80% of a saturated flux density. Such a flux density in turn preferably establishes the impedance of reactor SR, at a value, relative to the impedances of elements 36—38, that the grid voltage of valve V6, lags the anode voltage thereof by approximately 45 degrees. Under these conditions, as will be understood, valve V6 is conductive throughout approximately three-quarters of each successive half cycle of like polarity, and consequently, as is described below, maintains the impedance of transformer T2 at a comparatively low value. Under these conditions, for example, and as aforesaid, transformer T2 may have an effective impedance, in relation to the impedance of transformer T1 and its associated network including motor M, that approximately 90% of the voltage of the source L1—L2 is dissipated across transformer T1. At loads below rated below, the excitation of the direct current winding 54 is proportionately decreased, and at no load, may, for example, be such as to establish a phase angle of 120 to 150 degrees between the anode and grid voltages of valve V6; and an effective impedance for transformer T2 which causes approximately 40% of the voltage of the source L1—L2 can be dissipated across transformer T1. On the other hand, at maximum loads, of the order, for example, of 125% of rated load, the excitation of winding 54 may be such as to bring the grid voltage of valve V6 substantially in phase with its anode voltage, in which event the effective impedance of transformer T2 may be such that only approximately 5% of the voltage of the source L1—L2 is dissipated across transformer T2.

Reactor SR will be recognized as one which requires comparatively little iron, and the windings whereof are required to handle only comparatively small currents. For example, the D. C. excitation may be of the order of from 5 to 50 milliamperes between no load and full load conditions. Accordingly, reactor SR has a very quick response, of the order, for example, of only one to three cycles in changing from no load to full load conditions.

The excitation of winding 54, of reactor SR, is controlled by a regulating circuit 60, which is supplied with direct current energy, at substantially fixed voltage, from a source comprising rectifier V8 and transformer T3, having associated therewith, a usual ballast condenser 62 and a potentiometer resistor r2. Winding 54 is continuously connected, in shunt relation to a resistor 64, across the terminals 66 and 76, of the circuit 60, in series with a valve V9, of the continuous control or highly evacuated type. The grid-cathode voltage of valve V9, and consequently its resistance, is controlled by altering the conductivity of an associated valve V10, also of the continuous control or highly evacuated type. The cathode of valve V10 is continuously connected to supply terminal 68, and the anode thereof is connected, through parallel impedances 70 and 72, to an adjustable tap 74 on resistor r2. In turn, the control grid of valve V9 is connected to terminal 77, which is between the anode of valve V10 and impedances 70—72, and the cathode of valve V9 is connected to an adjustable tap 76 on resistor r2. Assuming, for example, that the voltage between terminals 66—68 is 540 volts, the voltage at tap 74 may be 270 volts, the voltage at tap 76 may be 130 volts, and the voltage between terminals 74 and 77 may be approximately 150 volts.

The grid-cathode circuit of valve V10 continuously represents the summation of the three previously mentioned components, derived respectively from the accelerating circuit 80, the load compensating circuit 82, and from the armature of motor M. More particularly, the grid of valve V10 is connected, through an accelerating-control condenser C6, and conductor 84, to the positive motor terminal 20. On the other hand, the cathode of valve V10, is connected, through the variable portion of potentiometer r3 between terminals 83—85, and conductors 86 and 88, to the negative motor terminal 22. As an example, and at base speed of the motor and rated load, the voltage of condenser C6 may be approximately 228 volts; the voltage between the armature terminals 20—22 may be approximately 230 volts, and the voltage derived from potentiometer r3 may be approximately 10 volts, leaving the grid of valve V10 approximately 8 volts negative with respect to its cathode. Under these conditions, which may be regarded as normal, the network 60 is preferably so adjusted that valve V9 passes enough exciting current to the reactor winding 54 to render valve V6 conductive between 75–80% of all each successive positive half cycle of the source.

The accelerating control network 80 includes, in addition to the previously mentioned condenser C6, a pair of normally closed contacts CFAb and CRAb on the auxiliary forward and reverse contactors CFA and CRA. These contacts and condenser C6 are connected by an adjustable tap 90, to a resistor 92, which in turn is connected by tap 94 to a potentiometer 96. Potentiometer 96 is connected, by an adjustable tap 98, to the previously mentioned potentiometer r1. With this relation, it will be appreciated that tap 94 serves to determine the maximum voltage which can be impressed across condenser C6, and consequently, as described below, determines the speed of the motor up to base speed. Tap 90, on the other hand, determines the rate at which charging current can be supplied to condenser C6, for any given setting of tap 94, and consequently determines the charging rate of condenser C6 and the acceleration rate of the motor.

The load compensating network 82 is supplied, through a usual rectifier V5, from a current transformer T13, the primary winding whereof is connected directly in series with the primary windings of transformers T1 and T2. The rectified output of transformer T13 thus varies directly with the motor load, and adds a compensating component of voltage to the regulating circuit 60 which is sufficient in value to compensate, to a desired degree, for the drooping load characteristic of the motor M as well as for the drooping load characteristic of the main rectifier comprising valves V1 and V2.

In the illustrated embodiment, the motor field winding 12 is supplied through a full wave rectifier comprising transformer T10 and valves V3 and V4. Of these valves, valve V3 is continuously in a wide open condition, whereas the grid of valve V4 is provided with a phase shift control circuit 100. More particularly, the grid of valve V4 is connected, through resistors 102 and 104 to an alternating current supply terminal 106, and is similarly connected, through variable resistors 108 and 110, and a condenser 112, to a second alternating current supply terminal 114. Terminals 106 and 114 are continuously connected through conductors 116 and 118, to the control-supply conductors L3 and L4. Conductors L3 and L4 are continuously energized from the main line conductors L1 and L2, through a control transformer T14. Further, terminals 106 and 114 are interconnected by resistors 120 and 122, and the grid of valve V3 is continuously connected through conductor 124 and condenser 126, to tap 128 which is intermediate the two resistors 120 and 122. Resistors 120 and 122 are preferably equal in value, so that the potential of tap 128 is approximately midway between the potentials of terminals 106 and 114. The phase relation between the cathode and grid potentials of valve V4 is consequently determined in accordance with the relative impedances of resistor 104 on the one hand, and of condenser 112 and resistors 108 and 110 on the other hand. Such phase relation is adjustable by means of the taps 107 and 111 associated with resistors 108 and 110. Tap 107 is ordinarily fixed as an incident to final inspection, and tap 111 is utilized for control purposes.

The load, consisting of the motor field 12, which is supplied by transformer T10 and valves V3 and V4, will be recognized as being very high in impedance. Consequently, utilizing the continuously open valve V3 and the variably controlled valve V4, a substantially uniform motor field excitation may be provided, the magnitude of which is inversely proportional to the phase angle between the cathode and grid voltages of valve V4. Preferably, and for operation of the system at or below base speed, the phase shift circuit 100 is so adjusted as to bring the cathode and grid voltages of valve V4 in phase with each other. For operation at speeds above base speed tap 111 may be adjusted, as pointed out above, to cause the grid voltage of valve V4 to lag behind the cathode voltage thereof, thereby progressively decreasing the portions of half cycles of like polarity through which valve V4 is conductive, and correspondingly decreasing the field current which is passed by valves V3 and V4. In this connection, it will be understood that valve V3 remains conductive throughout all of each full cycle minus the proportion of each half cycle of like polarity throughout which valve V4 is conductive.

A feature of the present arrangement resides in arranging the system so that independently of the setting of the motor field phase shifting circuit 100, a full motor field is maintained unless and until the motor attains base speed. More particularly, the cathode of valve V4 is continuously connected, through conductors 124 and 130 to the positive motor terminal 20. The grid of valve V4, on the other hand, is connected, through the phase shift circuit 100, and conductor 132, to an adjustable tap 134 on the previously mentioned potentiometer resistor r2. The terminal 136 of resistor r2 in turn is connected through the previously identified conductors 86 and the compensating resistor r3 to the negative motor terminal 22. With this relation, it will be appreciated that the grid-cathode voltage of valve V4 continuously includes four components, one being the phase shift voltage (which is uniform in amplitude but variable in phase), the second being the adjustable bias voltage between terminals 134 and 136, the third being the load responsive voltage component derived between terminals 83—85 of the compensating circuit 82, and the fourth being the motor terminal voltage between terminals 20 and 22. The three direct current components have the indicated polarities, and it will be understood that so long as the motor is operating at a speed which is below the base speed, at any given load, the bias voltage between terminals 134 and 136 sufficiently exceeds the algebraic sum of the above specified third and fourth voltage components to maintain the grid of valve V4 positive with respect to its cathode at the beginning of each half cycle during which the anode of valve V4 is positive. With this relation, valve V4 is conductive throughout all of each such half cycle. On the other hand, assuming that the motor is operating at base speed, the bias voltage between terminals 134 and 136 substantially equals the algebraic sum of the above specified third and fourth components, in which event the firing point of valve V4 is determined substantially entirely by the setting of the phase shift circuit 100.

It is believed that any remaining pertinent details of the present system may best be understood from a description of the operation thereof as a whole. The parts normally occupy the positions shown in the drawings. Assuming it is desired to place the motor M in operation, the disconnect switches LS1 and LS2 may be closed. Such action completes obvious energizing circuits for the primary windings of transformers TC and T14. Upon being energized, transformer TC supplies energy to transformers T3 through T12, as previously mentioned. Of these, transformer T4 supplies filament current to valves V1 and V2, transformer T5 supplies filament current to valve V5; transformer T6 supplies filament current to valve V7; transformer T8 supplies filament current to valve V8; transformer T11 supplies filament current to valves V3 and V4; and transformer T12 supplies filament current to valve V6. All of the above-mentioned valves are of the gas filled or discontinuous type, valves V4 and V6 being of the grid controlled, discontinuous type.

The remaining above-mentioned transformers T7, T9, and T10 supply plate current for valves V7, V8, and V3 and V4. In addition to the above actions, energization of transformer TC supplies filament current to the previously identified continuous control or highly evacuated valves V9 and V10. If desired, of course, suitable time delay mechanism may be utilized to prevent a starting of the system until the above described heating circuits have been effective long enough to render the associated valves fully operative.

The energization of transformers T7 and T9 serves to energize the associated direct current circuits, establishing a bias potential for the grid of valve V6 between terminals 48 and 46, and also impressing anode potentials on valves V9 and V10. Under the conditions stated, the control grid of valve V10 is neutral with respect to its cathode (since all of the previously identified control components are at zero value). Accordingly, valve V10 is in a wide open condition.

With valve V10 in a wide open condition, terminal 77, and consequently the grid of valve V9, are at a potential not much above that of terminal 136, which potential is strongly negative with respect to terminal 76. Under the conditions stated accordingly, valve V9 is blocked, or virtually so, establishing a minimum excitation for the direct current winding 54 of the saturable reactor. At minimum excitation of winding 54, circuit 30 is phase shifted to a point at which valve V6 fires very late in each successive half cycle of like polarity, which condition corresponds, as is described below, to maximum impedance of transformer T2. The above actions are, of course, preparatory only, since the primary winding of transformer T2 is not energized.

The energization of transformer T14 energizes the control conductors L3 and L4, preparing the relay circuits for operation, and also energizes the phase shift circuit 100. Under the conditions stated, with the motor armature at rest, and with the main load circuit L interrupted, the grid of valve V4 is influenced only by the phase shift voltage from circuit 100 and the bias voltage between terminals 134 and 136, which latter voltage renders the grid of valve V4 strongly positive, thereby establishing full field conditions for the motor.

As a further incident to the preparations for starting the motor, the manual controls 94 and 111 may be adjusted to correspond to the desired speed, it being understood that control 94 determines the base speed (with full field) and that control 111 determines the degree to which the motor shall be accelerated above base speed. Assuming, for example, that it is desired to bring the motor up to a speed above the rated base speed for the motor, control 94 is adjusted to correspond to the rated base speed of the motor, and control 111 is adjusted to produce the needed amount of motor field weakening. Both adjustments are preparatory only, since the main load circuit L is interrupted, and since, independently of the adjustment of control 111, the bias voltage between terminals 134 and 136 is effective to maintain full excitation of the motor field 12.

Controls 94 and 111 may, of course, be mechanically interlocked so that control 111 cannot be moved away from the full field position except when control 94 is at the rated base-speed position.

The completion of the motor field excitation circuit energizes the field protective relay FR, which thereupon closes its sole contact FRa, preparing the motor starting circuits. Assuming a forward rotation is desired, the forward push button F may be momentarily operated, opening its interlock contacts a and closing its contacts b. Such action completes an obvious energizing circuit for the coils of the forward contactors CF and CFA, which thereupon move to the energized position. When energized, contactor CFA closes a holding circuit at its contact CFa, thereby permitting the release of the forward push button, without effect.

Upon being energized, the main forward contactor CF closes its contacts CFa, CFb, CFc, and CFd, and opens its back contact CFe. Closure of contacts CFa and CFb completes an obvious circuit, between line conductors L1—L2, for the primary windings of transformers T1, T13, and T2. At the same time, closure of contacts CFc and CFd completes an armature circuit for motor M, between terminals 20—22, of the proper polarity to cause forward rotation of the motor.

Finally, the opening of contact CFe interrupts, without effect, the usual dynamic braking circuit.

In addition to completing the above described self-holding circuit at its contact CFAa, closure of the auxiliary forward contactor CFA also, at contact CFAb, interrupts the normally complete discharge circuit for the accelerating control condenser C6.

In response to the aforesaid actions of the forward contactors CF and CFA, motor M starts, accelerates to, and operates at, the speed determined by the settings of controls 94 and 111, which in the example now being described are set to establish an operating speed somewhat in excess of base speed.

Considering first the acceleration of the motor to base speed, it will be recognized that at the instant the forward contactors are closed, the grid of valve V10 is neutral, with respect to its cathode, since all control components are of zero value. Under these conditions, as aforesaid, terminal 77 and consequently the grid of valve V9 are strongly negative with respect to the cathode of valve V9. Consequently, valve V9 is completely or virtually blocked off, establishing a minimum excitation for the direct current winding 54 of the saturable reactor. Under these conditions, circuit 30 is phase shifted to a point very late in the positive half cycles and consequently the impedance of transformer T2 is at substantially its maximum value. As a consequence, a low voltage, appropriate for starting purposes, is available to transformer T1.

It will be recalled that the algebraic sum of the voltages between terminals 20—22 and terminals 83—85 is continuously proportional to motor speed, assuming full compensation for motor load by circuit 82. Consequently, as the motor starts and accelerates, the just-mentioned voltages tend to drive the grid of valve V10 positive. On the other hand, the opening of contact CFAb enables the flow of charging current to condenser C6, the potential across which consequently rises at a rate determined by the adjustable characteristics of its charging circuit. The rising voltage across condenser C6 tends to drive the grid of valve V10 negative with respect to its cathode. At base speed, and rated load, as previously mentioned, the potential of condenser C6 exceeds the algebraic sum of the potentials between terminals 20—22 and 83—85 by approximately 8 volts.

In the very early stages of the starting operation, it may be expected that the algebraic sum of voltages between terminals 20—22 and terminals 83—85 will exceed the voltage of condenser C6. Such action drives the grid of valve V10 positive and maintains the low voltage conditions which obtained at the instant of closure of the starting contactor. At a time which may be expected to be still very early in the starting operation, the voltage of condenser C6 equals the aforesaid algebraic sum and thereafter, throughout the remainder of the accelerating operation, the voltage of condenser C6 exceeds such sum. The difference between the voltage of condenser C6 and said algebraic sum rises gradually, and as it rises, the negative bias on valve V10 is progressively increased, which progressively reduces the impedance of transformer T2 and increases the proportional of the line voltage which is absorbed by transformer T1.

It will be recognized that the above conditions obtain during a normal accelerating operation of the motor, the charging circuit for condenser C6 being set to accommodate an accelerating operation which is suited to the motor and the load.

If, for any reason, the motor fails to accelerate as rapidly as normal (which failure is reflected by a lower algebraic sum of the voltages between terminals 20—22 and 83—85) condenser C6 is enabled to increase the negative bias on valve V10, thereby further advancing the firing point of valve V6, and further reducing the impedance of transformer T2. On the other hand, if the motor tends to accelerate at a rate in excess of that established by the charging circuit for condenser C6, such tendency is reflected as a decrease in the negative bias on valve V10. Such a decrease retards the firing point of valve V6, and increases the impedance of transformer T2, thereby lowering the voltage available to the main transformer T1.

In the example now being given, circuit 80 is adjusted to establish the rated base speed for the motor and consequently the acceleration, as controlled by condenser C6, continues until rated base speed is reached.

It will be recalled that until such a time as rated base speed is reached, the positive bias applied to the grid of valve V4 from circuit 60 maintains full field on the motor. When, however, the rated base speed is attained, the biasing effect of the voltage from circuit 60 (terminals 134—136) is balanced out by the algebraic sum of the voltages between terminals 20—22 and 83—85. As soon as this action takes place, the phase shift circuit 100 becomes effective to determine the firing point, in successive half cycles of like polarity, of valve V4, in accordance with the setting of control 111. The attainment of base speed, in the example now being given accordingly, is accompanied by a reduction in the motor field strength, which causes the motor to accelerate to a value above base speed, as determined by the setting of control 111.

It is believed to be evident that if control 111 is set to correspond to a full field condition, the accelerating operation is completed when the motor attains base speed. It is believed to be equally evident that if it is desired to operate the motor at a speed below base speed, control 94 may be adjusted to a lower value, thereby correspondingly limiting the maximum voltage to which condenser C6 is charged, to a lower value. Since the motor operates at a speed at which the voltage components in the grid circuit of valve V10 bear a predetermined proportionality to each other, such normal operating speed can readily be adjusted by raising and lowering the potential to which condenser C6 is charged. Moreover, it is believed to be evident that higher or lower accelerating rates can be achieved by correspondingly adjusting control 90 to determine the rate at which condenser C6 is charged.

Considering now certain further aspects of the manner in which the control circuits associated with valve V6 serve to regulate the motor speed, it will be appreciated that at, for example, rated load, and at rated voltage of the source L1—L2, the motor operates at a normal speed, under which conditions the three voltage components in the grid circuit of valve V10 remain substantially uniform in value. Under these conditions, accordingly, the excitation of winding 54 of the saturable reactor and consequently the firing point of valve V6, and the impedance of transformer T2, all remain at substantially uniform values. If it be assumed that the load is altered, for example, increased, such increase immediately tends to cause motor M to decrease its speed. Such a decrease in speed is immediately reflected as an increase in the negative bias voltage applied to the grid of valve V10, which increase serves to decrease the impedance of transformer T2.

The circuits 30 and 60 are very sensitive to changes in the grid voltage of valve V10, relatively small such changes in grid voltage being reflected as relatively large changes in impedance of transformer T2. For example, it is preferred to arrange the system so that a change of one volt in grid potential of valve V10 produces enough change in the impedance of transformer T2 to compensate a change of up to 10% in the applied line voltage. Assuming that the compensating voltage between terminals 83—85 equals approximately 10 volts at rated load, it will be appreciated that a 10% change in load produces a change of approximately one volt in the compensating voltage, which is considerably in excess of the change in bias of valve V10 which is needed to sufficiently elevate the voltage applied to the motor to compensate for the 10% increase in load. Consequently, the regulating circuit stabilizes itself at a grid bias which differs from the normal 8 volt bias by just enough to compensate for the change in load. In the case of a 10% change in load, such change in grid bias of valve V10 may be only several hundredths of a volt, and the consequent change in motor speed which is needed to bring the three grid components into equilibrium at the new value may be expected of the order of a fraction of 1%.

Decreases in load, of course, produce an analogous but opposite change, and result in slight decreases in the negative bias voltage applied to the grid of valve V10.

It is also believed to be evident that the system compensates for changes in voltage of the source L1—L2 or output of the main rectifier, in the same manner that it compensates for changes in load on motor M.

Summarizing the above action, the present corrective circuits, because of the inertialess character of the apparatus, and because of the amplifying effect of the circuits, serve to produce, virtually immediate voltage correction in response to exceedingly minute changes in speed, whether produced by changes in load, which is in applied voltage, or other causes. As aforesaid, and as an example, an interval of from one to three cycles of the source, is sufficient to produce a full change in impedance of transformer T2 from a maximum value to a minimum value, or vice versa.

It will be understood that in the absence of the compensating circuit 82, the motor M performs as a conventional separately excited motor, and that, by adjusting tap 85, circuit 82 may be caused to partially, entirely, or over-compensate for motor load conditions.

In the illustrated embodiment of the invention, motor M may be stopped, by momentarily opening the stop button S, thereby causing the forward contactors CF and CFA to resume the de-energized positions, and restoring the circuits controlled thereby to the initial condition. In addition to disconnecting the armature 10 of motor M from the source, such action completes the dynamic braking circuit, including resistor 140, thereby promptly bringing the motor to rest. During the dynamic braking action, relay BR is energized and, at its contact BRa, prevents recompletion of either forward or reverse starting circuits. Reverse operation of the motor corresponds to the above described forward operation, with the exception that contactors CR and CRA are effective. These contactors complete circuits corresponding to those described with reference to contactors CF and CFA with the exception that the motor armature circuit is reversed.

Each stopping action of the motor completes a discharge circuit for the speed control and accelerating control condenser C6, thereby preparing it for a subsequent starting operation.

In the system of Figure 3, certain of the elements of the present invention are utilized to control the direct current field excitation of an alternating current generator G, which supplies an alternating current distribution system 150—152—154. In this instance, the generator field winding GF is supplied with exciting current from a source L1—L2, through a supply transformer 156, and a rectifier comprising valves 158 and 160. Valves 158 and 160 are preferably of the gas filled type, valve 160 also incorporating a starting grid g. The supply circuit for field winding GF will be recognized as being analogous to the supply circuit for the previously described motor field winding 12 of Figure 1, and it will consequently be understood that winding GF is supplied with continuous exciting current, substantially uniform in value, and of a value which is determined by the points in successive half cycles of like polarity, at which valve 160 is rendered conductive.

The grid cathode potential of valve 160 is controlled by a phase shift circuit 162 which corresponds generally in function and arrangement to the previously described phase shift circuit 30. More particularly, this phase shift circuit 162 comprises a supply transformer 164, the primary winding whereof is connected to receive energy from the above-mentioned transformer 156. One terminal of the secondary winding 166 of transformer 164 is connected, through impedance elements 168 and 170, to a terminal 172. The other terminal of winding 166 is connected to terminal 172 through a saturable reactor of the previously described type having alternating current windings 174 and 176, and a direct current winding 178. Terminal 172 in turn is connected through a resistor 180 to the grid of valve 160 and the center tap 182 of winding 166 is connected directly to the cathode of valve 160. Accordingly, the phase relation between the grid and cathode potentials of valve 160, and consequently its firing point in half cycles in which its anode is positive, are determined by the relative magnitudes of the impedances of element SR and of elements 168 and 170.

As in the system of Figure 1, the excitation of the direct current reactor winding 178, is controlled by a network 182, which includes valves V9 and V10, which cooperate in the previously described manner. Network 182 is supplied with energy through a full wave rectifier 184, which is conventionally connected to a supply transformer 186, and which transformer is illustrated as being supplied from line conductors L1 and L2, through control transformer TC'. As in the embodiment of Figure 1, the grid cathode voltage of valve V10, and consequently the excitation of the direct current reactor winding 178, are controlled in accordance with the algebraic sum of a pair of control voltages, one whereof is of a fixed reference value, and the other whereof is proportional to the voltage of generator G.

The fixed reference voltage is applied across a resistor 187, between terminals 189 and 188, and is derived from a direct current supply current 190 comprising a usual full wave rectifier 192, transformer 194, and a ballast condenser 196. Associated regulating elements to maintain the voltage between terminals 189 and 188 at a fixed value, independently of variations in the voltage derived from transformer 194, comprise a resistor 198, and a usual glow discharge valve 200.

The measuring voltage component is impressed between a fixed terminal 202, and an adjustable terminal 204 of a resistor 206. A potential proportional to the generator voltage is impressed across resistor 206, by means of a rectifying circuit 208, comprising a usual rectifier 210, a ballast condenser 212, and a supply transformer 214, the primary winding whereof is adapted for connection across the generator output conductors 152—154.

With the above arrangement, it will be appreciated that so long as the voltage between terminals 189—188 and 202—204 maintain a predetermined proportionality, a corresponding normal bias (for example, a negative bias of 8 volts) is applied to the grid of valve V10. When so biased, valve V10 causes valve V9 to pass a normal exciting current for the direct current winding 178 of the saturable reactor SR, thereby establishing a normal firing point for valve 160, and producing a normal field excitation for the generator. If the generator voltage tends to fall below the predetermined value, as determined by the setting of tap 204, such tendency is reflected as an increase in the negative bias on valve V10 which action increases the excitation of the saturable reactor control winding 178. The latter action advances the firing point of valve 160 and increases the generator field excitation. A tendency for the generator voltage to rise above the desired value, of course, produces a reverse or field weakening action.

As in the case of Figure 1, the degree to which the generator voltage is enabled to vary above or below the predetermined value depends upon the magnitude of the voltage change which is required to produce a corrective effect and upon the time required for the corrective influence to take effect. Exceedingly minute changes in generator voltage serve to produce a corrective effect on the present system, and the corrective action is very rapid. Consequently, in the presence of wide variations in loading on generator, or changes in the speed thereof, the system is enabled to maintain the voltage between conductors 150—152—154 between exceedingly close limits, differing, for example, by 1% or less.

Although only several specific embodiments of the invention have been described in detail, it will be appreciated that various further modifications in form and arrangement may be made without departing from the spirit and scope of the invention.

What is claimed is:

1. In a control system for a dynamo electric machine having an energizable winding adapted to be energized with direct current from a source of alternating current, first and second translating means having primary windings adapted for connection across said source, said translating means having secondary windings, means including rectifying means for connecting said energizable winding to the secondary winding of said first translating means, means for controlling the voltage impressed across said first translating means from said source including an electric valve having its principal electrodes connected across the terminals of said other secondary winding, and means responsive to an increase in current flowing to said energizable winding to vary the conductivity of said valve whereby an increased voltage is applied to said energizable winding.

2. In a control system for a dynamo electric machine having an energizable winding adapted to be energized with direct current from a source of alternating current, first and second translating means having primary windings adapted for connection across said source, said translating means having secondary windings, means including rectifying means for connecting said energizable winding to the secondary winding of said first translating means, means for controlling the voltage impressed across said first translating means from said source including an electric valve having its principal electrodes connected across the terminals of said other secondary winding, and phase shift means controlled in accordance with a pair of opposed electrical operating conditions of said machine for controlling the conductivity of said valve.

3. In a control system for a dynamo electric machine having an energizable winding adapted to be energized with direct current from a source of alternating current, first and second translating means having primary windings adapted for connection across said source, said translating means having secondary windings, means including rectifying means for connecting said energizable winding to the secondary winding of said first translating means, means for controlling the voltage impressed across said first translating means from said source including an electric valve having its principal electrodes connected across the terminals of said other secondary winding, phase shift means including a saturable reactor for controlling the conductivity of said valve, and means responsive to an electrical condition of said machine for controlling the impedance of said reactor.

4. In a control system for a dynamo electric machine having an energizable winding adapted to be energized with direct current from a source of alternating current, first and second translating means having primary windings adapted for connection across said source, said translating means having secondary windings, means including rectifying means for connecting said energizable winding to the secondary winding of said first translating means, means for controlling the voltage impressed across said first translating means from said source including an electric valve having its principal electrodes connected across the terminals of said other secondary winding, phase shift means including a saturable reactor for controlling the conductivity of said valve, and means including a pair of vacuum tubes for controlling the impedance of said reactor, said reactor being coupled to the principal electrodes of one of said tubes, and the other of said tubes serving to control the conductivity of said one tube.

5. The system of claim 4 including means responsive to an electrical condition of said machine for controlling said other tube.

6. In a control system for a dynamo electric machine having an energizable winding adapted to be energized with direct current from a source of alternating current, first and second translating means having primary windings adapted for connection across said source, said translating means having secondary windings, means including rectifying means for connecting said energizable winding to the secondary winding of said first translating means, means for controlling the voltage impressed across said first translating means from said source including electric valve means for controlling the flow of current through the secondary winding of said second translating means, and means including a saturable reactor for controlling the conductivity of said electric valve means.

7. The system of claim 6 wherein said last-mentioned means includes a pair of vacuum tubes, said reactor having an exciting winding which is coupled to the principal electrodes of one of said tubes, and said other tube serving to control the conductivity of said one tube.

8. The system of claim 6 wherein said last-mentioned means includes a pair of vacuum tubes, said reactor having an exciting winding which is coupled to the principal electrodes of one of said tubes, said other tube serving to control the conductivity of said one tube, and means responsive to an electrical condition of said machine for controlling said other tube.

9. The system of claim 6 wherein said last-mentioned means includes a pair of vacuum tubes, said reactor having an exciting winding which is coupled to the principal electrodes of one of said tubes, said other tube serving to control the conductivity of said one tube, means for producing a plurality of voltages including a reference voltage and a voltage proportional to an electrical condition of said machine, and means controlled in accordance with the algebraic sum of said voltages for controlling said other tube.

10. In a control system for a dynamo electric machine having an energizable winding of relatively high impedance adapted to be energized with direct current from a source of alternating current, a translating means having a primary winding adapted for connection to said source, and a secondary winding, means including a pair of electric valves for connecting said energizable winding to said secondary winding so as to produce a flow of direct current through said energizable winding, one of said valves being conductive throughout substantially all of successive half cycles of one polarity of said source, and means for controlling the magnitude of said energizing current including means for variably controlling the portions of intervening half cycles of opposite polarity throughout which said other valve means is conductive.

11. The system of claim 10 wherein said last-mentioned means includes phase shift means.

12. The system of claim 10 wherein said last-mentioned means includes phase shift means controlled in accordance with an electrical condition of said machine.

13. The system of claim 10 wherein said dynamo electric machine is an alternating current generator and wherein the last-mentioned means of claim 10 includes phase shift means which are controlled in accordance with the output voltage of said generator.

14. The system of claim 10 wherein said dynamo electric machine is a motor, said energizable winding is a field winding thereof, wherein the last-mentioned means of claim 10 includes phase shift means responsive to the operating speed of said motor.

15. In a control system for a dynamoelectric machine having an energizable winding adapted to be energized with direct current from a source of alternating current, first and second translating means having primary windings connected in series across said source, said translating means having secondary windings, means including rectifying means for connecting said energizable winding to the secondary winding of said first translating means, means for controlling the voltage impressed across said first translating means from said source including electric valve means for controlling the flow of current through the secondary winding of said second translating means, and means responsive to the combined effect of a pair of electrical operating conditions of such machine for controlling the conductivity of said electric valve means.

16. In a control system for a dynamo electric machine having an armature including a winding and a field winding, a pair of terminals adapted to be supplied with alternating current energy, means including an electric valve for connecting one of said windings to said terminals, said valve having a controlling electrode and main electrodes, means for placing an alternating bias between one of said main electrodes and said control electrode for controlling the current flow through said valve, a phase shifting network for shifting the phase of said bias relative to that across said main electrode and including an energizable phase shifting apparatus, and a measuring network for variably controlling the phase shifting network as a function of armature voltage, said measuring network comprising a first and a second electric valve each having a pair of main electrodes and a control electrode, means providing a reference voltage and a voltage proportional to the voltage appearing across the armature of said machine, means connecting said voltages between one of said main electrodes and said control electrode of said first valve, an energizing circuit for said apparatus including said main electrodes of said second valve, means actuated by current flow through said first valve for providing a voltage between said control electrode and one of said main electrodes of said second valve.

17. In a control system for a dynamo electric machine having an armature including a winding and a field winding, a pair of terminals adapted to be supplied with alternating current energy, means including an electric valve for connecting one of said windings to said terminals, said valve having a controlling electrode and main electrodes, means for placing an alternating bias between one of said main electrodes and said control electrode whereby current flow through said valve is controlled, a phase shifting network including a saturable reactor for shifting the phase of said bias relative to that at said main electrodes, and a measuring network for variably controlling the phase shifting network as a function of armature voltage, said measuring network comprising a first and a second electric valve each having a pair of main electrodes and a control electrode, means providing a reference voltage and a voltage proportional to the voltage appearing across the armature of said machine, means connecting said voltages between one of said main electrodes and said control electrode of said first valve, an energizing circuit for said reactor including said main electrodes of said second valve, and means actuated by current flow through said first valve for providing a voltage between said control electrode and one of said main electrodes of said second valve.

18. In a control system for a dynamo electric machine having an energizable winding adapted to be energized with direct current from a source of alternating current, first translating means having primary and secondary windings, said primary winding being adapted for connection across said source, an impedance means having a plurality of pairs of terminals and controlling the output voltage of said secondary winding, means including rectifying means for connecting said energizable winding to said secondary winding, means including said impedance means for controlling the voltage impressed across said energizable winding from said source and further including an electric valve having its principal electrodes connected across a second of said pairs of terminals of said impedance means, means responsive to a pair of operating characteristics of said machine for controlling the conductivity of said valve.

19. In a control system for a dynamo electric machine having an energizable winding adapted to be energized with direct current from a source of alternating current, first translating means having a primary and a secondary winding, said primary winding being adapted for connection across said source, an impedance means having a plurality of pairs of terminals, one of said pairs of terminals being connected in series with one of said translating means windings, means including rectifying means for connecting said energizable winding to said secondary winding, means including said impedance means for controlling the voltage impressed across said energizable winding from said source and further including an electric valve having its principal electrodes connected across a second of said pairs of terminals of said impedance means, means responsive to a pair of operating characteristics of said machine for controlling the conductivity of said valve.

20. In a control system for a dynamo electric machine having an energizable winding adapted to be energized with direct current from a source of alternating current, first translating means having primary and secondary windings, said primary winding being adapted for connection across said source, an impedance means having a plurality of pairs of terminals, one of said pairs of terminals being connected in series with one of said windings, means including rectifying means for connecting said energizable winding to said secondary winding, means including said impedance means for controlling the voltage impressed across said energizable winding from said source and further including an electric valve having its principal electrodes connected across a second of said pairs of terminals of said impedance means, means responsive to the voltage of and the current flow through such winding of said machine for controlling the conductivity of said valve.

21. In a control system for energizing a direct current motor, having an armature and a field winding, from an alternating current source comprising, a first and second translating means having primary windings adapted for connection across said source, said translating means having secondary windings, means including rectifying means for connecting said armature to the secondary winding of said first translating means, means for controlling the voltage impressed across said first translating means from said source including an electric valve having its principal electrodes connected across the terminals of said other secondary winding, a circuit for controlling the conductivity of said valve and including a portion responsive to the speed of such armature and a portion responsive to the current flowing in such armature, said circuit acting to control the conductivity of said valve to increase the potential supplied to such armature as a function of the increase in current flow through such armature and to decrease the potential supplied to such armature as a function of an increase in speed of such armature.

22. In a control system for energizing a direct current motor, having an armature and a field winding, from an alternating current source comprising, a first and second translating means having primary windings adapted for connection across said source, said translating means having secondary windings, means including rectifying means for connecting said armature to the secondary winding of said first translating means, means for controlling the voltage impressed across said first translating means from said source including an electric valve having its principal electrodes connected across the terminals of said other secondary winding, a circuit for controlling the conductivity of said valve and including a portion responsive to the voltage across such armature and a portion responsive to the current flowing in such armature, said circuit acting to control the conductivity of said valve to increase the potential supplied to such armature as a function of the increase in current flow through such armature and to decrease the potential supplied to such armature as a function of an increase in voltage across such armature.

23. In a control system for a dynamoelectric machine supplied with direct current from an alternating current source through an electric valve the combination of a phase shifting network having an output voltage controlling the flow of energy through such valve, a measuring network for variably controlling the phase of the output voltage of such shifting network comprising a first and a second electric valve each having a pair of main electrodes and a control electrode, means providing a reference voltage and a voltage proportional to a voltage appearing across such machine, means connecting said voltages between one of said main electrodes and said control electrode of said first valve, an energizing circuit for determining the phase of the output of said shifting network including said main electrodes of said second valve, and means actuated by current flow through said first valve for providing a voltage between said control electrode and one of said main electrodes of said second valve.

24. In a control system for a dynamoelectric machine supplied with direct current from an alternating current source through an electric valve the combination of a phase shifting network including a saturable reactor for providing a phase shifted voltage for controlling the flow of energy through such valve, a measuring network for variably controlling the phase of the output voltage of such shifting network comprising a first and a second electric valve each having a pair of main electrodes and a control electrode, means providing a reference voltage and a voltage proportional to a voltage appearing across such machine, means connecting said voltages between one of said main electrodes and said control electrode of said first valve, an energizing circuit for said reactor including said main electrodes of said second valve, and means actuated by current flow through said first valve for providing a voltage between said control electrode and one of said main electrodes of said second valve.

25. In a controlling circuit, a pair of electric valves each having a pair of main electrodes and a control electrode, means establishing a bias voltage between one of the main electrodes and said control electrode of one of said valves, a source of potential having a plurality of output voltage taps, said one main electrode of said one valve being connected to one of said taps, one of said main electrodes of the other of said valves being connected to a second of said taps whose potential is more positive than that of said one tap, said control electrode of said other valve being connected to the other of said one valve main electrodes, means including an impedance element connecting said one valve other electrode to a third of said taps, said third tap having a potential more positive than that of said second tap, and circuit means connecting the other of said main electrodes of said other valve to a fourth of said taps, said fourth tap having a potential more positive than that of said second tap.

GUSTAV E. UNDY.

REFERENCES CITED

The following references are of record in the file of this patent:

UNITED STATES PATENTS

| Number | Name | Date |
|---|---|---|
| 2,005,892 | Gulliksen | June 25, 1935 |
| 2,086,594 | Young | July 13, 1937 |
| 2,100,715 | Jenks | Nov. 30, 1937 |
| 2,206,123 | Rinia, et al. | July 2, 1940 |
| 2,220,755 | Edwards | Nov. 5, 1940 |
| 2,399,266 | Stiefel | Apr. 30, 1946 |